United States Patent
Schmitz et al.

(10) Patent No.: US 11,897,372 B2
(45) Date of Patent: Feb. 13, 2024

(54) RECLINER HEART HAVING BIASING MEMBERS

(71) Applicant: Fisher & Company, Incorporated, St. Clair Shores, MI (US)

(72) Inventors: Ralph L. Schmitz, Clinton Township, MI (US); Sapan M. Poptani, Northville, MI (US); Christopher J. Ryan, Fraser, MI (US); Lawrence J. Magadanz, Clinton Township, MI (US)

(73) Assignee: Fisher & Company, Incorporated, St. Clair Shores, MI (US)

(*) Notice: Subject to any disclaimer, the term of this patent is extended or adjusted under 35 U.S.C. 154(b) by 0 days.

(21) Appl. No.: 17/720,609

(22) Filed: Apr. 14, 2022

(65) Prior Publication Data
US 2022/0355711 A1    Nov. 10, 2022

Related U.S. Application Data

(60) Provisional application No. 63/184,885, filed on May 6, 2021.

(51) Int. Cl.
*B60N 2/23* (2006.01)
*B60N 2/225* (2006.01)
(Continued)

(52) U.S. Cl.
CPC .............. *B60N 2/236* (2015.04); *B60N 2/20* (2013.01); *B60N 2/225* (2013.01); *B60N 2205/50* (2013.01)

(58) Field of Classification Search
CPC ........ B60N 2/2362; B60N 2/236; B60N 2/23; B60N 2/235; B60N 2/225
See application file for complete search history.

(56) References Cited

U.S. PATENT DOCUMENTS 3,736,026 A    5/1973    Ziegler et al.
3,953,069 A    4/1976    Tamura et al.
(Continued)

FOREIGN PATENT DOCUMENTS

CA    2369034 A1       7/2002
CA    2759299 A1  *  12/2011  ........... B60N 2/2356
(Continued)

OTHER PUBLICATIONS

Office Action regarding Canadian Patent Application No. 2,812,408, dated Jun. 17, 2016.
(Continued)

*Primary Examiner* — Timothy J Brindley
(74) *Attorney, Agent, or Firm* — Harness, Dickey & Pierce, P.L.C.

(57) ABSTRACT

A recliner heart includes a first locking plate, a second locking plate, a hub, a pair of wedges, a first biasing member, and a second biasing member. The first locking plate includes first teeth. The second locking plate is rotatable relative to the first locking plate and includes second teeth. The first biasing member is configured to apply a first biasing force to the wedges. The second biasing member is configured to apply a second biasing force to the wedges. The hub is rotatable between a first position in which the first and second biasing forces are applied to the wedges to restrict rotation of the second locking plate relative to the first locking plate, and a second position in which the first biasing force applied to one wedge of the wedges is reduced to allow rotation of the second locking plate relative to the first locking plate.

20 Claims, 12 Drawing Sheets

(51) Int. Cl.
*B60N 2/235* (2006.01)
*B60N 2/20* (2006.01)

(56) References Cited

U.S. PATENT DOCUMENTS

| | | |
|---|---|---|
| 4,219,234 A | 8/1980 | Bell |
| 4,243,264 A | 1/1981 | Bell |
| 4,279,442 A | 7/1981 | Bell |
| 4,372,610 A | 2/1983 | Fisher, III et al. |
| 4,457,557 A | 7/1984 | Une |
| 4,484,779 A | 11/1984 | Suzuki |
| 4,579,387 A | 4/1986 | Bell |
| 4,634,182 A | 1/1987 | Tanaka |
| 4,684,174 A | 8/1987 | Bell |
| 4,705,319 A | 11/1987 | Bell |
| 4,720,145 A | 1/1988 | Bell |
| 4,733,912 A | 3/1988 | Secord |
| 4,747,641 A | 5/1988 | Bell |
| 4,795,213 A | 1/1989 | Bell |
| 4,822,100 A | 4/1989 | Bell |
| 4,919,482 A | 4/1990 | Landis et al. |
| 4,928,374 A | 5/1990 | Allen |
| 5,007,680 A | 4/1991 | Miyauchi et al. |
| 5,044,647 A | 9/1991 | Patterson |
| 5,154,476 A | 10/1992 | Haider et al. |
| 5,240,309 A | 8/1993 | Kojer |
| 5,248,184 A | 9/1993 | Morris |
| 5,265,937 A | 11/1993 | Allen |
| 5,393,116 A | 2/1995 | Bolsworth et al. |
| 5,419,616 A | 5/1995 | Paetzold |
| 5,435,624 A | 7/1995 | Bray et al. |
| 5,460,429 A | 10/1995 | Whalen |
| 5,489,141 A | 2/1996 | Strausbaugh et al. |
| 5,577,805 A | 11/1996 | Glinter et al. |
| 5,590,932 A | 1/1997 | Olivieri |
| 5,622,410 A | 4/1997 | Robinson |
| 5,628,215 A | 5/1997 | Brown |
| 5,660,440 A | 8/1997 | Pejathaya |
| 5,718,481 A | 2/1998 | Robinson |
| 5,769,493 A | 6/1998 | Pejathaya |
| 5,788,330 A | 8/1998 | Ryan |
| 5,813,724 A | 9/1998 | Matsuura et al. |
| 5,823,622 A | 10/1998 | Fisher, IV et al. |
| 5,857,659 A | 1/1999 | Kato et al. |
| 5,918,939 A | 7/1999 | Magadanz |
| 5,927,809 A | 7/1999 | Tame |
| 5,941,591 A | 8/1999 | Tsuge et al. |
| 5,947,560 A | 9/1999 | Chen |
| 5,979,986 A | 11/1999 | Pejathaya |
| 6,007,152 A | 12/1999 | Kojima et al. |
| 6,023,994 A | 2/2000 | Yoshida |
| 6,047,444 A | 4/2000 | Braun |
| 6,068,341 A | 5/2000 | Rink |
| 6,074,009 A | 6/2000 | Farino |
| 6,095,609 A | 8/2000 | Magadanz |
| 6,106,067 A | 8/2000 | Zhuang et al. |
| 6,123,380 A | 9/2000 | Sturt et al. |
| 6,139,104 A | 10/2000 | Brewer |
| 6,158,800 A | 12/2000 | Tsuge et al. |
| 6,161,899 A | 12/2000 | Yu |
| 6,199,953 B1 | 3/2001 | Chen |
| 6,250,704 B1 | 6/2001 | Garrido |
| 6,290,297 B1 | 9/2001 | Yu |
| 6,328,381 B1 | 12/2001 | Smuk |
| 6,345,867 B1 | 2/2002 | Hellrung et al. |
| 6,447,066 B1 | 9/2002 | Chabanne et al. |
| 6,511,129 B1 | 1/2003 | Minor et al. |
| 6,533,357 B2 | 3/2003 | Pospeshil et al. |
| 6,550,864 B2 | 4/2003 | Zarna et al. |
| 6,554,362 B1 | 4/2003 | Pospeshil |
| 6,634,713 B2 | 10/2003 | Nonomiya et al. |
| 6,669,296 B2 | 12/2003 | Moriyama et al. |
| 6,669,299 B2 | 12/2003 | Carlson et al. |
| 6,698,837 B2 | 3/2004 | Pejathaya et al. |
| 6,709,053 B1 | 3/2004 | Humer et al. |
| 6,740,845 B2 | 5/2004 | Stol et al. |
| 6,758,525 B2 | 7/2004 | Uramichi |
| 6,854,802 B2 | 2/2005 | Matsuura et al. |
| 6,857,703 B2 | 2/2005 | Bonk |
| 6,860,562 B2 | 3/2005 | Bonk |
| 6,869,143 B2 | 3/2005 | Secord |
| 6,908,156 B1 | 6/2005 | Park et al. |
| 7,025,422 B2 | 4/2006 | Fast |
| 7,093,901 B2 | 8/2006 | Yamada |
| 7,097,253 B2 | 8/2006 | Coughlin et al. |
| 7,100,987 B2 | 9/2006 | Volker et al. |
| 7,121,624 B2 | 10/2006 | Pejathaya et al. |
| 7,152,924 B1 | 12/2006 | Nemoto et al. |
| 7,154,065 B2 | 12/2006 | Martukanitz et al. |
| 7,172,253 B2 | 2/2007 | Haverkamp |
| 7,198,330 B2 | 4/2007 | Wahlen et al. |
| 7,293,838 B2 | 11/2007 | Sugama et al. |
| 7,296,857 B2 | 11/2007 | Shinozaki et al. |
| 7,300,109 B2 | 11/2007 | Hofmann et al. |
| 7,306,286 B2 | 12/2007 | Syrowik et al. |
| 7,328,954 B2 | 2/2008 | Sasaki et al. |
| 7,360,838 B2 | 4/2008 | Smuk |
| 7,419,217 B2 | 9/2008 | Ishizuka |
| 7,458,639 B2 | 12/2008 | Thiel et al. |
| 7,490,907 B2 | 2/2009 | Nagura et al. |
| 7,500,719 B2 | 3/2009 | Kojima |
| 7,503,099 B2 | 3/2009 | Pejathaya |
| 7,527,336 B2 | 5/2009 | Kienke et al. |
| 7,578,556 B2 | 8/2009 | Ohba et al. |
| 7,604,297 B2 | 10/2009 | Weber |
| 7,695,068 B2 | 4/2010 | Maeda et al. |
| 7,775,591 B2 | 8/2010 | Hahn et al. |
| 7,775,594 B2 | 8/2010 | Bruck et al. |
| 7,976,103 B2 | 7/2011 | Gamache et al. |
| 8,052,215 B2 | 11/2011 | Ito |
| 8,128,169 B2 | 3/2012 | Narita et al. |
| 8,360,527 B2 | 1/2013 | Lehmann |
| 8,430,454 B2 | 4/2013 | Tanguy et al. |
| 8,449,034 B2 | 5/2013 | Tame et al. |
| 8,845,019 B2 | 9/2014 | Sawada |
| 8,985,690 B2 | 3/2015 | Yamada et al. |
| 9,102,248 B2 | 8/2015 | Matt |
| 9,108,541 B2 | 8/2015 | Assmann et al. |
| 9,221,364 B2 | 12/2015 | Nock et al. |
| 9,227,532 B2 | 1/2016 | Balzar et al. |
| 9,296,315 B2 | 3/2016 | Hellrung |
| 9,475,409 B2 | 10/2016 | Jiang et al. |
| 9,527,410 B2 | 12/2016 | Leconte |
| 9,527,419 B2 | 12/2016 | Hosbach et al. |
| 9,555,725 B2 | 1/2017 | Rothstein et al. |
| 9,573,493 B2 | 2/2017 | Nagura et al. |
| 9,616,779 B2 | 4/2017 | Barzen et al. |
| 9,623,774 B2 | 4/2017 | Yamada et al. |
| 9,701,222 B2 | 7/2017 | Kitou |
| 9,751,432 B2 | 9/2017 | Assmann |
| 9,873,357 B1 | 1/2018 | McCulloch et al. |
| 9,889,774 B2 | 2/2018 | Espinosa et al. |
| 10,065,538 B2 * | 9/2018 | Desquesne ............... B60N 2/20 |
| 10,150,387 B2 | 12/2018 | Hiemstra et al. |
| 10,279,709 B2 | 5/2019 | Suzuki et al. |
| 10,399,466 B2 | 9/2019 | Chang |
| 10,610,018 B1 | 4/2020 | Madhu |
| 10,787,098 B2 | 9/2020 | Smuk |
| 10,800,296 B2 | 10/2020 | Schmitz et al. |
| 10,864,830 B2 | 12/2020 | Schmitz et al. |
| 11,052,797 B2 | 7/2021 | Poptani et al. |
| 2002/0043852 A1 | 4/2002 | Uramichi |
| 2003/0127898 A1 | 7/2003 | Niimi et al. |
| 2003/0178879 A1 | 9/2003 | Uramichi |
| 2003/0230923 A1 | 12/2003 | Uramichi |
| 2004/0134055 A1 | 7/2004 | Aizaki |
| 2004/0145226 A1 | 7/2004 | Bonk |
| 2004/0195889 A1 | 10/2004 | Secord |
| 2005/0029806 A1 | 2/2005 | Yamanashi et al. |
| 2005/0253439 A1 | 11/2005 | Sasaki et al. |
| 2006/0006718 A1 | 1/2006 | Umezaki |
| 2006/0012232 A1 | 1/2006 | Coughlin et al. |
| 2006/0055223 A1 | 3/2006 | Thiel et al. |
| 2006/0170269 A1 | 8/2006 | Oki |

(56) References Cited

U.S. PATENT DOCUMENTS

| | | |
|---|---|---|
| 2007/0138854 A1 | 6/2007 | Paing et al. |
| 2007/0145800 A1 | 6/2007 | Thiel et al. |
| 2007/0200408 A1 | 8/2007 | Ohta et al. |
| 2008/0001458 A1 | 1/2008 | Hoshihara et al. |
| 2008/0164741 A1 | 7/2008 | Sakamoto |
| 2009/0001797 A1 | 1/2009 | Neumann |
| 2009/0056124 A1 | 3/2009 | Krebs et al. |
| 2009/0072602 A1 | 3/2009 | Schuler |
| 2009/0250989 A1 | 10/2009 | Endo et al. |
| 2010/0072802 A1 | 3/2010 | Smith et al. |
| 2010/0096892 A1 | 4/2010 | Meghira et al. |
| 2010/0096896 A1 | 4/2010 | Nonomiya |
| 2010/0176621 A1 | 7/2010 | Aufrere et al. |
| 2010/0231021 A1 | 9/2010 | Myers et al. |
| 2010/0283304 A1 | 11/2010 | Thiel |
| 2010/0308634 A1 | 12/2010 | Narita et al. |
| 2010/0308635 A1 | 12/2010 | Tame et al. |
| 2010/0320823 A1 | 12/2010 | Thiel |
| 2011/0025114 A1 | 2/2011 | Berndtson et al. |
| 2011/0068612 A1 | 3/2011 | Thiel |
| 2011/0127814 A1 | 6/2011 | Thiel |
| 2011/0169314 A1 | 7/2011 | Tanguy et al. |
| 2011/0227386 A1 | 9/2011 | Berndtson et al. |
| 2011/0309665 A1 | 12/2011 | Leighton et al. |
| 2012/0086253 A1 | 4/2012 | Nock et al. |
| 2012/0169102 A1 | 7/2012 | Hiemstra et al. |
| 2012/0248841 A1 | 10/2012 | Hellrung et al. |
| 2012/0313415 A1 | 12/2012 | Nonomiya et al. |
| 2013/0161995 A1 | 6/2013 | Yamada et al. |
| 2013/0207434 A1 | 8/2013 | Stilleke et al. |
| 2013/0270884 A1 | 10/2013 | Espinosa et al. |
| 2014/0001806 A1* | 1/2014 | Golarz ............... B60N 2/2252 297/362 |
| 2014/0008956 A1* | 1/2014 | Golarz ............... B60N 2/225 297/354.1 |
| 2014/0008958 A1 | 1/2014 | Ito |
| 2014/0091607 A1 | 4/2014 | Maeda |
| 2014/0138998 A1 | 5/2014 | Christoffel et al. |
| 2014/0159458 A1 | 6/2014 | Lu et al. |
| 2014/0225411 A1 | 8/2014 | Matt |
| 2014/0239691 A1 | 8/2014 | Hellrung |
| 2014/0239693 A1 | 8/2014 | Nock et al. |
| 2014/0301682 A1 | 10/2014 | Leppla |
| 2015/0015044 A1 | 1/2015 | Teufel et al. |
| 2015/0042133 A1 | 2/2015 | Munemura et al. |
| 2015/0069809 A1 | 3/2015 | Matt |
| 2015/0091346 A1 | 4/2015 | Kitou |
| 2015/0091354 A1 | 4/2015 | Enokijima et al. |
| 2015/0123444 A1 | 5/2015 | Assmann |
| 2015/0266398 A1 | 9/2015 | Higashi et al. |
| 2015/0306986 A1 | 10/2015 | Jarry et al. |
| 2015/0321585 A1 | 11/2015 | McCulloch et al. |
| 2016/0023577 A1 | 1/2016 | Yamada et al. |
| 2016/0107546 A1 | 4/2016 | Barzen et al. |
| 2016/0272089 A1 | 9/2016 | Kim et al. |
| 2016/0339810 A1 | 11/2016 | Pluta et al. |
| 2017/0021743 A1 | 1/2017 | Hiemstra et al. |
| 2017/0037945 A1 | 2/2017 | Maeda et al. |
| 2017/0080828 A1 | 3/2017 | Aktas |
| 2017/0088021 A1 | 3/2017 | Noguchi et al. |
| 2017/0136921 A1 | 5/2017 | Dill et al. |
| 2017/0253152 A1* | 9/2017 | Maeda ............... B60N 2/20 |
| 2018/0043800 A1 | 2/2018 | Maeda et al. |
| 2018/0056819 A1 | 3/2018 | Schmitz et al. |
| 2018/0103760 A1 | 4/2018 | Fujita et al. |
| 2018/0154802 A1 | 6/2018 | Ito |
| 2018/0208087 A1 | 7/2018 | Baba et al. |
| 2018/0339613 A1 | 11/2018 | Mizobata |
| 2018/0361886 A1 | 12/2018 | Chang |
| 2019/0255979 A1 | 8/2019 | Zahn et al. |
| 2019/0299821 A1 | 10/2019 | Maeda et al. |
| 2019/0329674 A1 | 10/2019 | Schmitz et al. |
| 2019/0337424 A1 | 11/2019 | Chang |
| 2019/0358694 A1 | 11/2019 | Yamakita |
| 2020/0047644 A1 | 2/2020 | Schmitz et al. |
| 2020/0070689 A1 | 3/2020 | Naik et al. |
| 2020/0164775 A1* | 5/2020 | Chang ............... B60N 2/2227 |
| 2020/0253380 A1 | 8/2020 | Schmitz et al. |
| 2020/0282879 A1 | 9/2020 | Schmitz et al. |
| 2020/0331367 A1 | 10/2020 | Schmitz et al. |
| 2021/0039528 A1 | 2/2021 | Poptani et al. |
| 2021/0061139 A1 | 3/2021 | Schmitz et al. |
| 2021/0276461 A1 | 9/2021 | Schmitz et al. |

FOREIGN PATENT DOCUMENTS

| | | | |
|---|---|---|---|
| CA | 2869816 A1 | 10/2013 | |
| CN | 1291566 A | 4/2001 | |
| CN | 1457306 A | 11/2003 | |
| CN | 1840382 A | 10/2006 | |
| CN | 101148152 A | 3/2008 | |
| CN | 101616820 A | 12/2009 | |
| CN | 101925485 A | 12/2010 | |
| CN | 102126451 A | 7/2011 | |
| CN | 102131673 A | 7/2011 | |
| CN | 202086037 U | 12/2011 | |
| CN | 102442228 A | 5/2012 | |
| CN | 103025568 A | 4/2013 | |
| CN | 103298652 A | 9/2013 | |
| CN | 203228664 U | 10/2013 | |
| CN | 203381519 U | 1/2014 | |
| CN | 103702860 A | 4/2014 | |
| CN | 103857314 A | 6/2014 | |
| CN | 203974603 U | 12/2014 | |
| CN | 105189196 A | 12/2015 | |
| CN | 205097989 U | 3/2016 | |
| CN | 205130981 U | 4/2016 | |
| CN | 106799978 A | 6/2017 | |
| CN | 107364369 A | 11/2017 | |
| CN | 107428269 A | 12/2017 | |
| CN | 107972542 A | 5/2018 | |
| CN | 207291755 U | 5/2018 | |
| CN | 108263253 A | 7/2018 | |
| CN | 109515263 A * | 3/2019 | |
| CN | 109562707 A | 4/2019 | |
| CN | 112339625 A | 2/2021 | |
| DE | 907608 C | 3/1954 | |
| DE | 1098292 B | 1/1961 | |
| DE | 4324734 A1 | 1/1995 | |
| DE | 20220200 U1 * | 3/2004 | ............. B60N 2/167 |
| DE | 102007002366 B3 | 7/2008 | |
| DE | 102008026176 A1 | 12/2009 | |
| DE | 102008029438 A1 | 12/2009 | |
| DE | 102010038795 A1 | 2/2012 | |
| DE | 102011013163 A1 | 9/2012 | |
| DE | 102012009159 A1 | 11/2012 | |
| DE | 102011108976 A1 | 1/2013 | |
| DE | 102012008940 A1 | 11/2013 | |
| DE | 112014000343 T5 | 9/2015 | |
| DE | 102017100374 A1 | 7/2017 | |
| DE | 202018107311 U1 | 2/2019 | |
| EP | 1074426 A2 | 2/2001 | |
| GB | 1136097 A | 12/1968 | |
| GB | 1546104 A | 5/1979 | |
| GB | 2441871 A * | 3/2008 | ........... B60N 2/2252 |
| JP | 2000084684 A | 3/2000 | |
| JP | 2000153327 A | 6/2000 | |
| JP | 2001186957 A | 7/2001 | |
| JP | 2002119349 A | 4/2002 | |
| JP | 5290789 B2 | 9/2013 | |
| JP | 5555969 B2 | 7/2014 | |
| KR | 20030092869 A | 12/2003 | |
| KR | 100601809 B1 | 7/2006 | |
| KR | 20070119332 A * | 12/2007 | |
| KR | 100817000 B1 | 3/2008 | |
| KR | 20090035633 A | 4/2009 | |
| KR | 20140001651 A | 1/2014 | |
| KR | 101420164 B1 | 7/2014 | |
| KR | 101655777 B1 | 9/2016 | |
| WO | WO-9620848 A1 | 7/1996 | |
| WO | WO-2006069630 A2 * | 7/2006 | ........... B60N 2/2252 |
| WO | WO-2011069107 A2 | 6/2011 | |
| WO | WO-2013133245 A1 | 9/2013 | |
| WO | WO-2013152433 A1 * | 10/2013 | ........... B60N 2/2252 |

(56) References Cited

FOREIGN PATENT DOCUMENTS

| WO | WO-2013167240 A1 | 11/2013 | |
|---|---|---|---|
| WO | WO-2015012287 A1 * | 1/2015 | ........... B60N 2/2362 |
| WO | WO-2016115986 A1 | 7/2016 | |
| WO | WO-2017118496 A1 | 7/2017 | |
| WO | WO-2021020580 A1 * | 2/2021 | ............... B60N 2/16 |

OTHER PUBLICATIONS

Office Action regarding German Patent Application No. 102016114406. 1, dated Apr. 27, 2020. Translation provided by Witte, Weller & Partner Patentanwälte mbB.

International Search Report regarding International Application No. PCT/US2020/021377, dated Jun. 30, 2020.

Written Opinion of the International Searching Authority regarding International Application No. PCT/US2020/021377, dated Jun. 30, 2020.

Office Action regarding German Patent Application No. 102020208717. 2, dated Feb. 16, 2021.

Office Action regarding German Patent Application No. 102019211855. 0, dated Feb. 4, 2021. Partial translation provided by Bardehle Pagenberg Partnerschaft mbB.

SPI Lasers UK Ltd., "Opening new possibilities with single mode oscillation welding (CW)." Presented at: Laser World of Photonics China; Shanghai, China (Mar. 2008).

Office Action regarding German Patent Application No. 102019212517. 4, dated Mar. 11, 2021. Partial translation provided by Bardehle Pagenberg Partnerschaft mbB.

Office Action regarding Indian Patent Application No. 201921032346, dated Mar. 18, 2021.

Office Action regarding Chinese Patent Application No. 201910334168. 9, dated Apr. 30, 2021. Translation provided by Unitalen Attorneys at Law.

Office Action regarding German Patent Application No. 102013103671. 6, dated May 20, 2021. Translation provided by Witte, Weller & Partner Patentanwälte mbB.

First Chinese Office Action regarding Application No. 201910801476.8 dated Aug. 10, 2021. English translation provided by Unitalen Attorneys at Law.

Office Action regarding U.S. Appl. No. 16/996,991, dated Sep. 9, 2021.

Notice of Allowance regarding U.S. Appl. No. 16/996,991, dated Oct. 4, 2021.

Office Action regarding U.S. Appl. No. 16/542,369, dated Jul. 16, 2021.

Office Action regarding U.S. Appl. No. 16/542,369, dated May 17, 2021.

Notice of Allowance regarding U.S. Appl. No. 16/542,369, dated Oct. 10, 2021.

Office Action regarding U.S. Appl. No. 16/842,135, dated Sep. 16, 2021.

Office Action regarding U.S. Appl. No. 16/740,874, dated Apr. 26, 2021.

Office Action regarding U.S. Appl. No. 16/740,874, dated Aug. 16, 2021.

Office Action regarding U.S. Appl. No. 16/811,112, dated Sep. 3, 2021.

Office Action regarding German Application No. 102019110151.4, dated Jul. 12, 2021.

Office Action regarding German Patent Application No. 102020200559. 1, dated Jul. 23, 2021.

Office Action regarding Chinese Patent Application No. 201910725351. 1, dated Jul. 5, 2021.

Office Action regarding U.S. Appl. No. 16/740,874, dated Oct. 20, 2021.

Office Action regarding German Patent Application No. 10 2019 211 855.0, dated Nov. 25, 2021.

Office Action regarding Chinese Patent Application No. 2021120202214440, dated Dec. 7, 2021.

Office Action regarding Chinese Patent Application No. 201910801476. 8, dated Dec. 17, 2021.

Office Action regarding Chinese Patent Application No. 202010305091. 5, dated Jan. 27, 2022. Translation provided by Unitalen Attorneys at Law.

Non-Final Office Action regarding U.S. Appl. No. 17/181,189 dated May 19, 2022.

Office Action regarding German Patent Application 10 2020 204 814.2 dated Jun. 8, 2022.

Office Action regarding Chinese Patent Application No. 2020103050915, dated Jun. 23, 2022.

Office Action regarding Chinese Patent Application No. 020107827129, dated Jun. 1, 2022.

Chinese Office Action regarding Patent Application No. 2021102452677, dated Oct. 28, 2022.

Chinese Office Action regarding Application No. 202010885551.6, dated Jul. 21, 2022.

Notice of Allowance regarding U.S. Appl. No. 17/586,203, dated Jul. 26, 2023.

Notice of Allowance regarding U.S. Appl. No. 17/824,027 dated Aug. 30, 2023.

Notice of Allowance regarding U.S. Appl. No. 16/842,135 dated Sep. 20, 2023.

Notice of Allowance regarding U.S. Appl. No. 17/824,027 dated Sep. 25, 2023.

Office Action regarding Patent Application No. 102022201243.7, dated May 12, 2023.

* cited by examiner

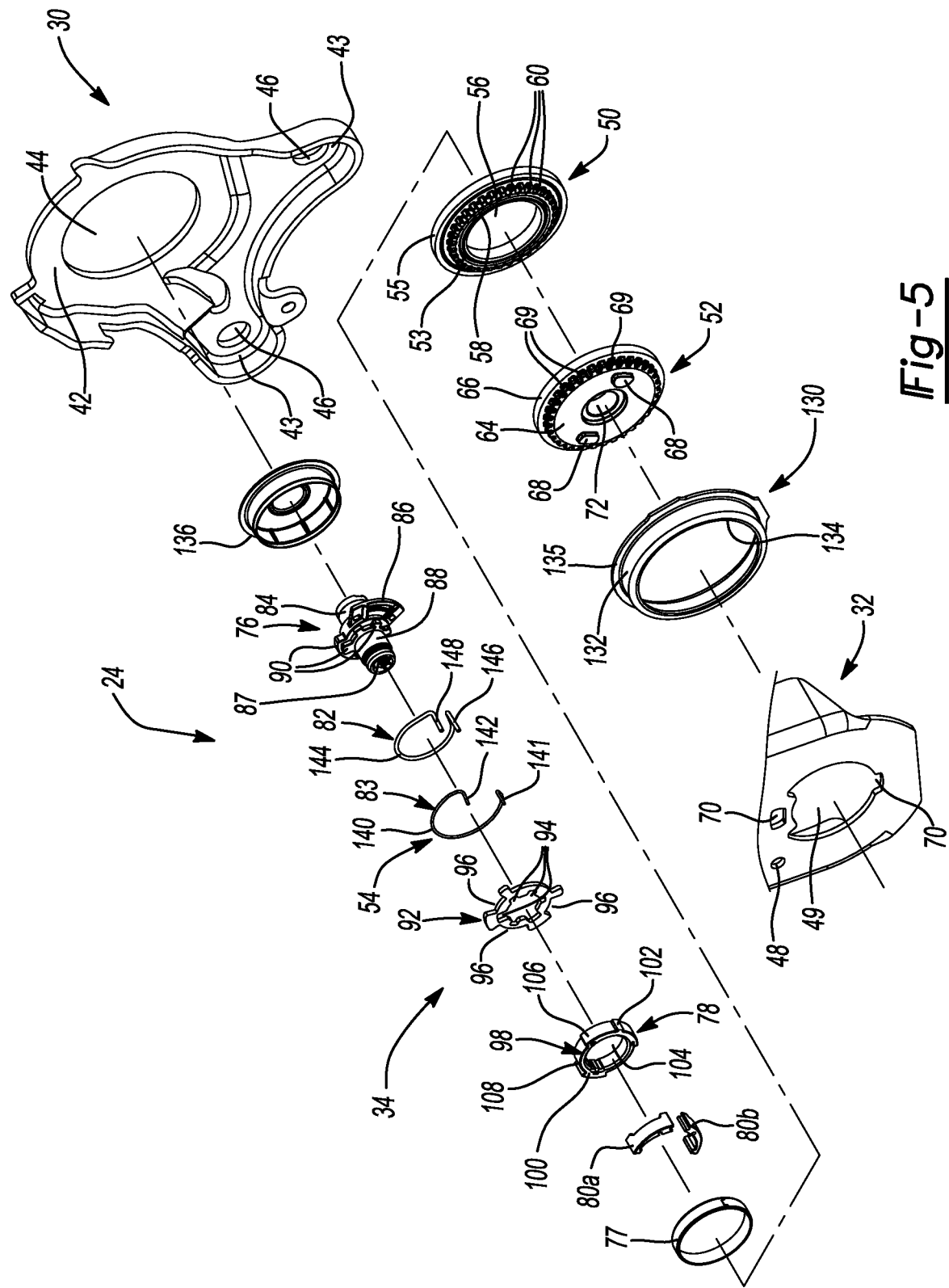

RECLINER HEART HAVING BIASING MEMBERS

CROSS-REFERENCE TO RELATED APPLICATIONS

This application claims the benefit of U.S. Provisional Application No. 63/184,885, filed on May 6, 2021. The entire disclosure of the above application is incorporated herein by reference.

FIELD

The present disclosure relates to a recliner heart having biasing members.

BACKGROUND

This section provides background information related to the present disclosure and is not necessarily prior art.

Vehicle seats often include a recliner heart that can selectively rotate a seatback relative to a seat bottom. The recliner heart is operable between a locked position in which the seatback is prevented from being rotated relative to the seat bottom, and an unlocked position in which the seatback is allowed to rotate relative to the seat bottom. The recliner heart includes a biasing member that biases the recliner heart into the locked position. Such biasing member may not provide sufficient force to reduce free play between the seatback and seat bottom when the recliner heart is in the locked position. Providing a biasing member with greater biasing force may result in failure of the internal components of the recliner heart when the recliner heart is in the locked position. The present disclosure provides a recliner heart having biasing members that provide sufficient force to reduce free play between the seatback and seat bottom without resulting in failure of the internal components of the recliner heart.

SUMMARY

This section provides a general summary of the disclosure, and is not a comprehensive disclosure of its full scope or all of its features.

In one form, the present disclosure provides a recliner heart that includes a first locking plate, a second locking plate, a hub, a pair of wedges, and first and second biasing members. The first locking plate includes an outer diametrical surface having first teeth formed thereon. The second locking plate is rotatable relative to the first locking plate and includes a first inner diametrical surface having second teeth formed thereon. Some of the second teeth are meshingly engaged with some of the first teeth. The hub extends through the first and second locking plates and is configured to rotate. The first biasing member is configured to apply a first biasing force to the pair of wedges and the second biasing member is configured to apply a second biasing force to the pair of wedges. The hub is rotatable between a first position in which the first and second biasing forces are applied to the pair of wedges to restrict rotation of the second locking plate relative to the first locking plate, and a second position in which the first biasing force applied to one wedge of the pair of wedges is reduced to allow rotation of the second locking plate relative to the first locking plate.

In some configurations of the recliner heart of the above paragraph, the second biasing member applies the second biasing force to the pair of wedges when the first hub is in the second position.

In some configurations of the recliner heart of any one or more of the above paragraphs, the first and second biasing forces are applied independently of each other.

In some configurations of the recliner heart of any one or more of the above paragraphs, the first biasing force is greater than the second biasing force.

In some configurations of the recliner heart of any one or more of the above paragraphs, the first biasing member is a first spring and the first biasing force is a first spring force. The second biasing member is a second spring and the second biasing force is a second spring force. The first spring force is greater than the second spring force.

In some configurations of the recliner heart of any one or more of the above paragraphs, the second biasing member surrounds the first biasing member.

In some configurations of the recliner heart of any one or more of the above paragraphs, the second biasing member is disposed between the pair of wedges and is made of a resiliently compressible material.

In some configurations of the recliner heart of any one or more of the above paragraphs, the second biasing member is saturated with lubricant.

In some configurations of the recliner heart of any one or more of the above paragraphs, a bushing ring is disposed between the pair of wedges and the first locking plate. The second biasing member is configured to rotate relative to the bushing ring to lubricate the bushing ring.

In another form, the present disclosure provides a recliner heart that includes a first locking plate, a second locking plate, a hub, a pair of wedges, and first and second springs. The first locking plate includes an outer diametrical surface having first teeth formed thereon. The second locking plate is rotatable relative to the first locking plate and includes a first inner diametrical surface having second teeth formed thereon. Some of the second teeth are meshingly engaged with some of the first teeth. The hub extends through the first and second locking plates and is configured to rotate. The hub includes a pair of projections spaced apart from each other. The first spring is configured to apply a first spring force to the pair of wedges. The second spring is configured to apply a second spring force to the pair of wedges. The hub is rotatable between a first position in which the first and second spring forces are applied to the pair of wedges to restrict rotation of the second locking plate relative to the first locking plate, and a second position in which one of the projections contacts the first spring to reduce the first spring force applied to one wedge of the pair of wedges thereby allowing rotation of the second locking plate relative to the first locking plate.

In some configurations of the recliner heart of the above paragraph, each wedge includes a first end, an opposing second end, an arcuate inner surface, and an arcuate outer surface. A first groove is formed at the second end and a second groove is formed at the arcuate inner surface.

In some configurations of the recliner heart of any one or more of the above paragraphs, the first spring includes first and second legs and the second spring includes third and fourth legs. The first and second legs are disposed in respective first grooves and the third and fourth legs are disposed in respective second grooves.

In some configurations of the recliner heart of any one or more of the above paragraphs, each wedge increases in thickness from the first end toward the second end.

In some configurations of the recliner heart of any one or more of the above paragraphs, the second spring surrounds the first spring.

In some configurations of the recliner heart of any one or more of the above paragraphs, the first spring force is greater than the second spring force.

In some configurations of the recliner heart of any one or more of the above paragraphs, the first and second biasing forces are applied independently of each other.

In some configurations of the recliner heart of any one or more of the above paragraphs, the projections define a curved slot therebetween. The first spring is at least partially received in the curved slot.

In some configurations of the recliner heart of any one or more of the above paragraphs, the first spring includes a first leg and a second leg. The first and second legs extend through the curved slot. When the hub is in the first position, both of the projections are spaced apart from both of the first and second legs. When the hub is in the second position, the one of the first and second projections contacts one of the first and second legs of the first spring to reduce the first spring force applied to the one wedge of the pair of wedges.

In some configurations of the recliner heart of any one or more of the above paragraphs, the hub includes a flange portion, a hub portion extending axially from a first side of the flange portion and a shaft portion extending axially from a second side of the flange portion and through the first and second locking plates. The projections extend from the flange portion.

In some configurations of the recliner heart of any one or more of the above paragraphs, the first spring includes a first leg and a second leg. When the hub is in the second position, one of the projections contacts one of the first and second legs of the first spring to reduce the first spring force applied to one wedge of the pair of wedges.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is an exploded view of the recliner heart of FIG. 3;

Corresponding reference numerals indicate corresponding parts throughout the several views of the drawings.

DETAILED DESCRIPTION

Figure 1:
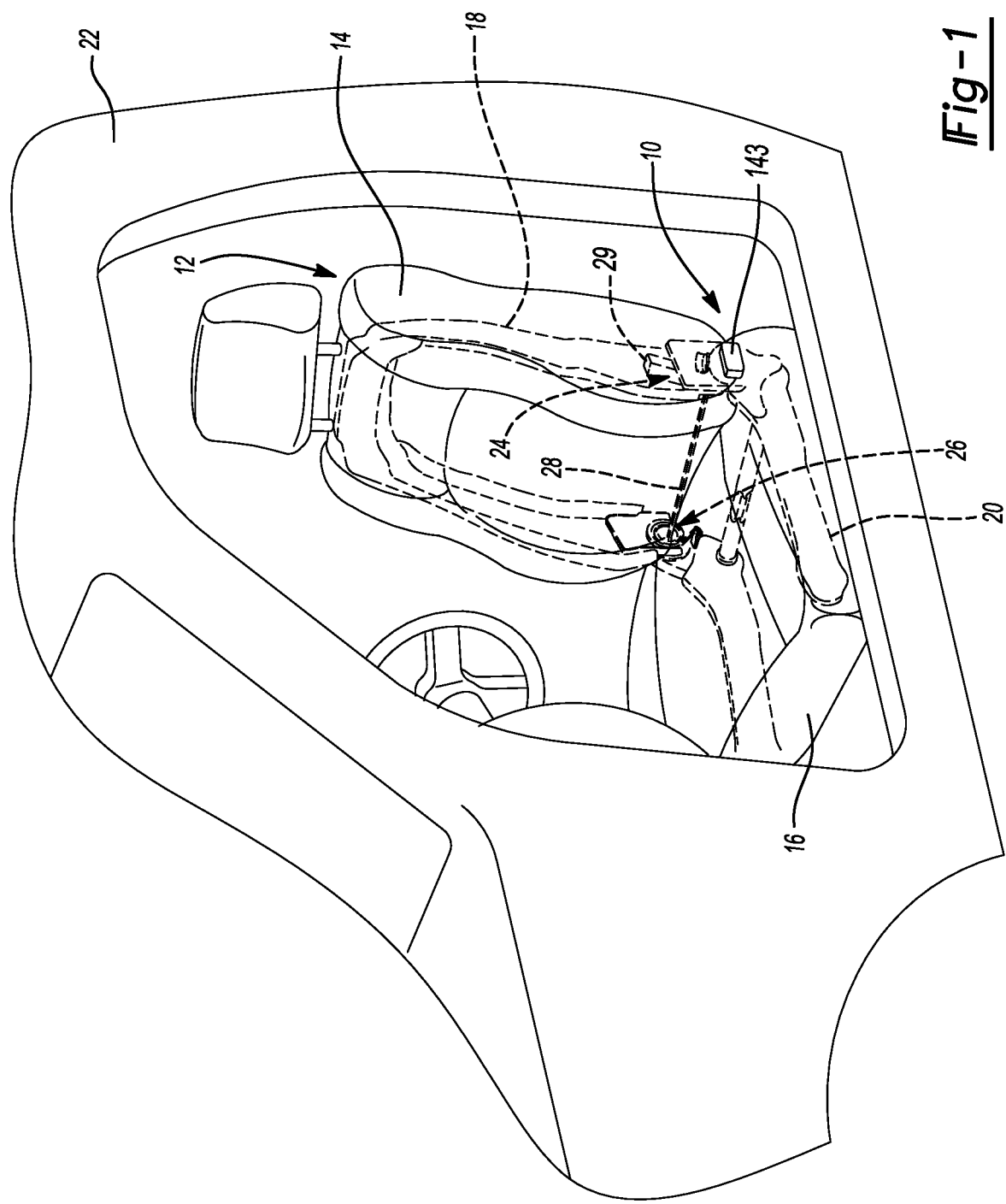
FIG. 1 is a partial perspective view of a vehicle having a seat incorporating a recliner assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
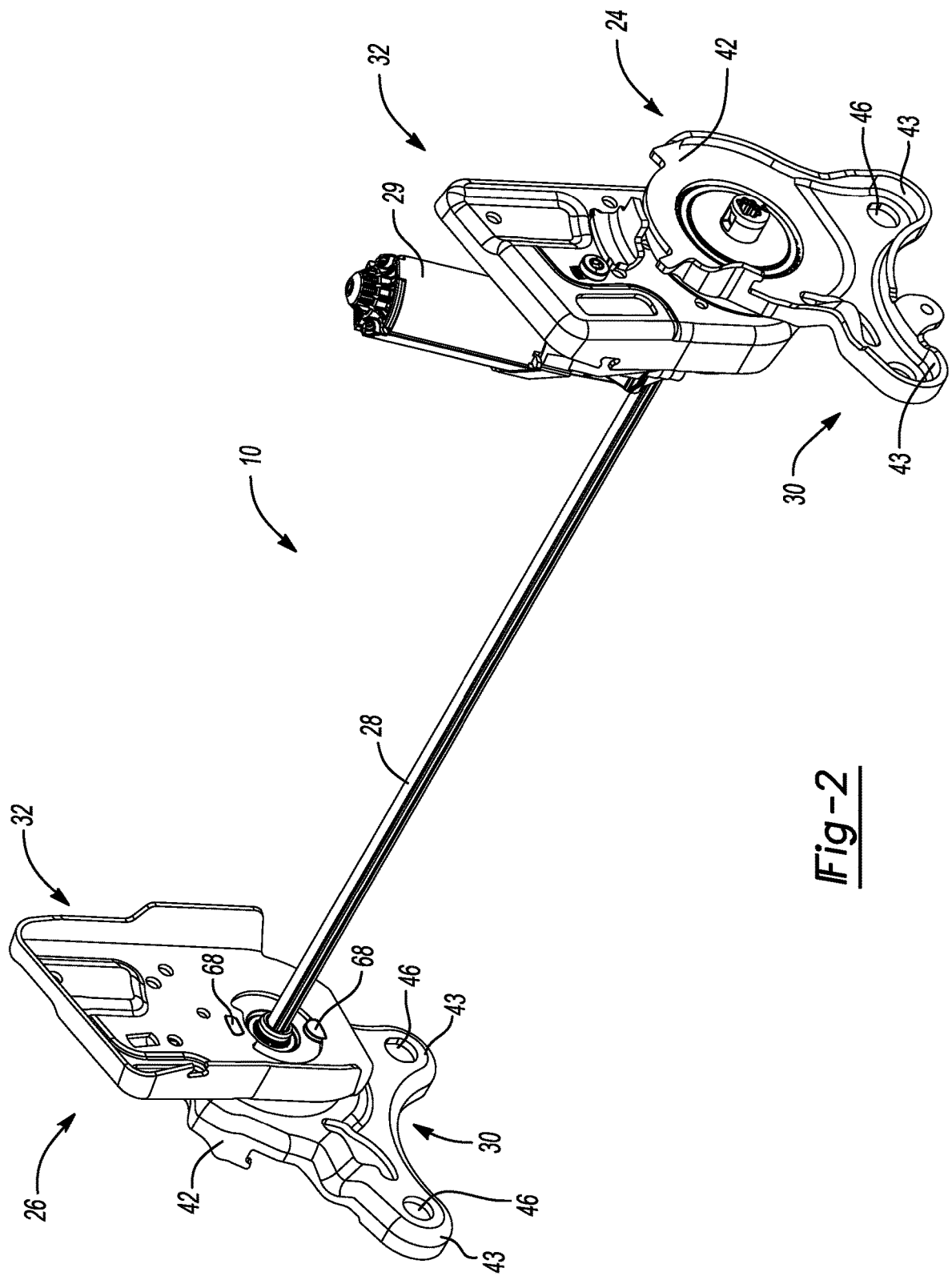
FIG. 2 is a perspective view of the recliner assembly of FIG. 1.

With reference to FIGS. 1 and 2, a recliner assembly 10 is provided that may be incorporated into a vehicle seat assembly 12 having a seatback 14 and a seat bottom 16. The seatback 14 and seat bottom 16 may include a seatback frame 18 and a seat bottom frame 20, respectively. The seat assembly 12 may be positioned in a vehicle 22, as shown in FIG. 1. The recliner assembly 10 may include a first recliner mechanism 24, a second recliner mechanism 26, a cross member 28, and a motor 29.

Figure 6:
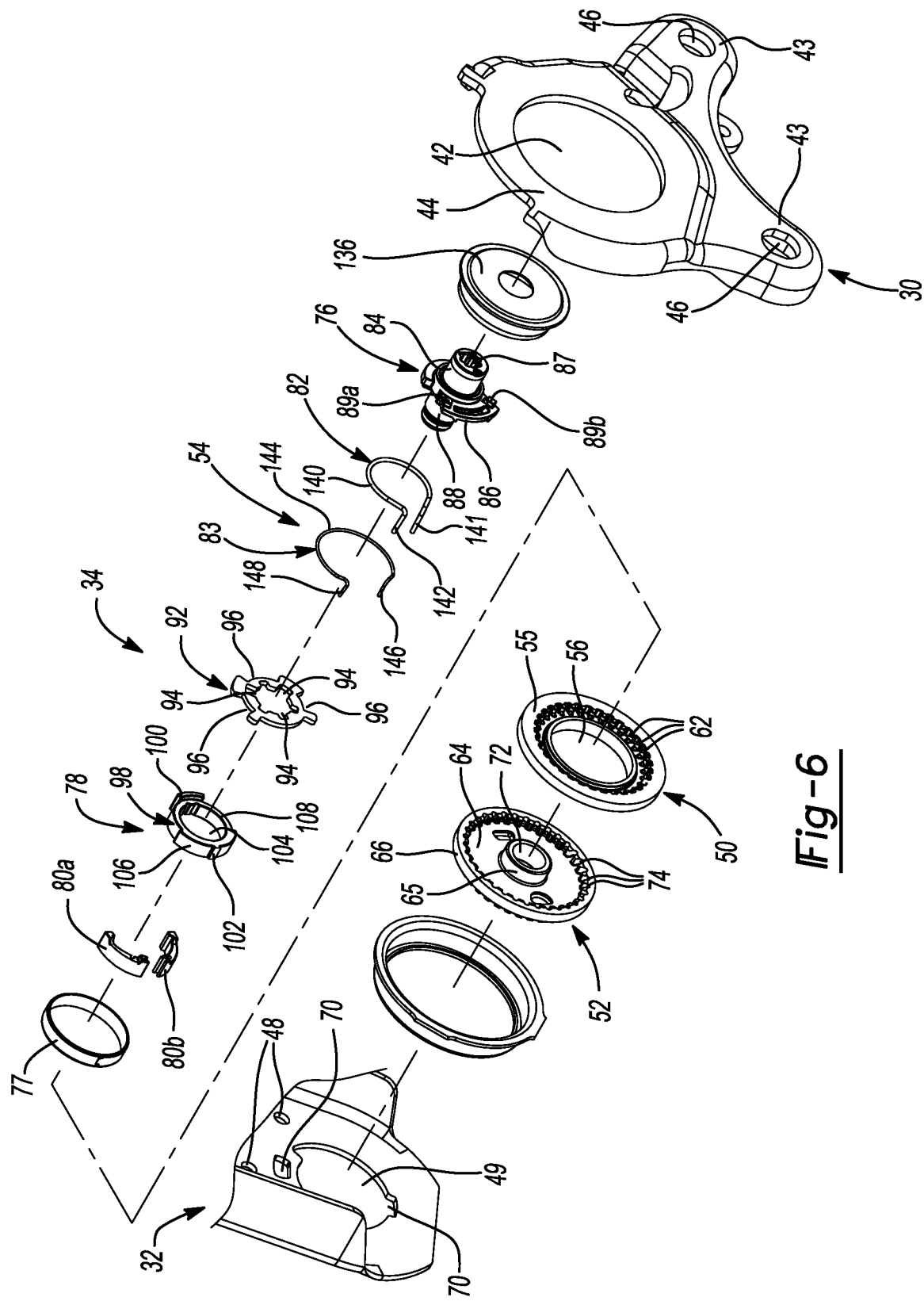
FIG. 6 is another exploded view the recliner heart.

The first and second recliner mechanisms 24, 26 may be operable in a locked state preventing relative rotation between the seatback 14 and the seat bottom 16 and an unlocked state permitting relative rotation between the seatback 14 and the seat bottom 16 among an upright position (FIG. 1), a rearward reclined position (not shown) and a forward dump position (not shown). As shown in FIGS. 5 and 6, the first recliner mechanism 24 may include a first bracket 30, a second bracket 32 and a recliner heart (or locking mechanism) 34.

The first bracket 30 may include a generally round main body 42 and a pair of mounting lobes 43 that extend outward from the main body 42. The main body 42 may define a central aperture 44. The mounting lobes 43 may include a plurality of apertures 46 through which fasteners (not shown) may extend to securely attach the first bracket 30 to the seat bottom frame 20 of the seat assembly 12.

As shown in FIGS. 5 and 6, the second bracket 32 may be generally rectangular and may include a plurality of apertures 48, and a central aperture 49 through which the cross member 28 extends. Fasteners (not shown) may extend through the plurality of apertures 48 to securely attach the second bracket 32 to the seatback frame 18 of the seat assembly 12.

The recliner heart 34 may be mounted to the first and second brackets 30, 32 and may selectively permit relative rotation between the seatback 14 and the seat bottom 16. The recliner heart 34 may be a round recliner heart, for example, or any other suitable type of recliner heart. As shown in FIGS. 3-6, the recliner heart 34 may include a first locking plate 50 (FIGS. 3, 5 and 6), a second locking plate 52 (FIGS. 4-6) and a locking assembly 54 (FIGS. 5 and 6).

The first locking plate 50 may be rotationally fixed to the first bracket 30 (FIG. 8) and may have a generally circular shape. As shown in FIGS. 5 and 6, the first locking plate 50 may include an inner section 53 and a rim or outer section 55. The inner section 53 may define an opening 56 and may include an outer diametrical surface 58 having teeth 60 thereon. The rim 55 may be rotationally fixed to the first bracket 30 and may extend 360 degrees around a periphery of the inner section 53. The rim 55 may include an inner diametrical surface having teeth 62 thereon.

Figure 4:
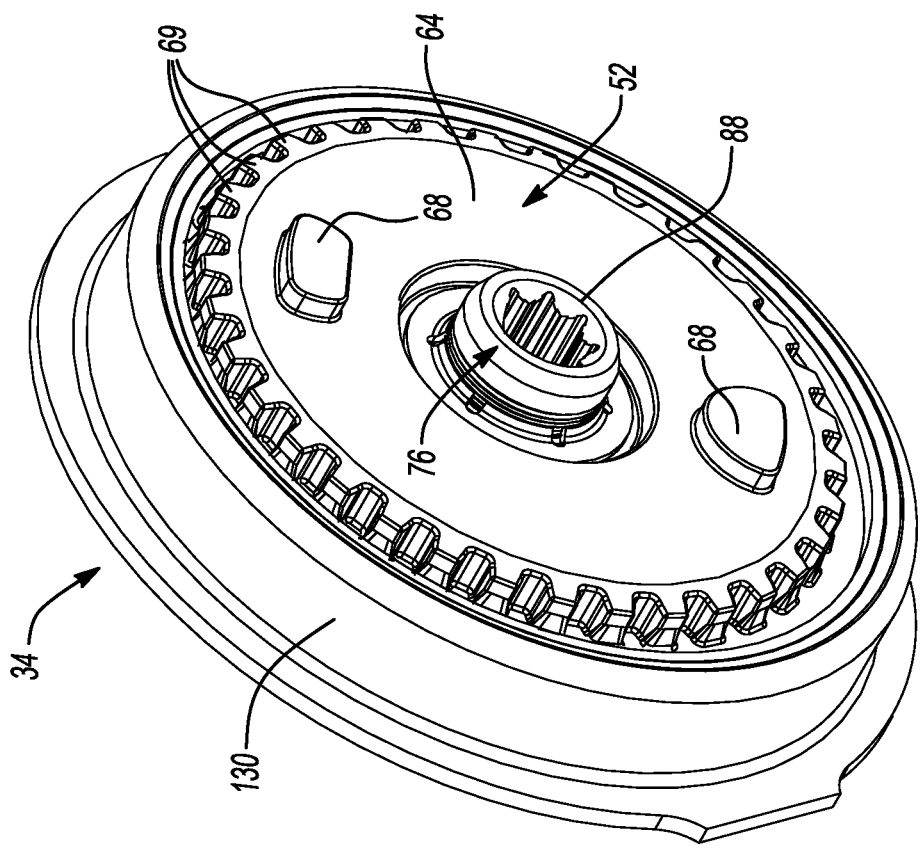
FIG. 4 is another perspective view of one recliner heart of the recliner assembly.
Figure 3:
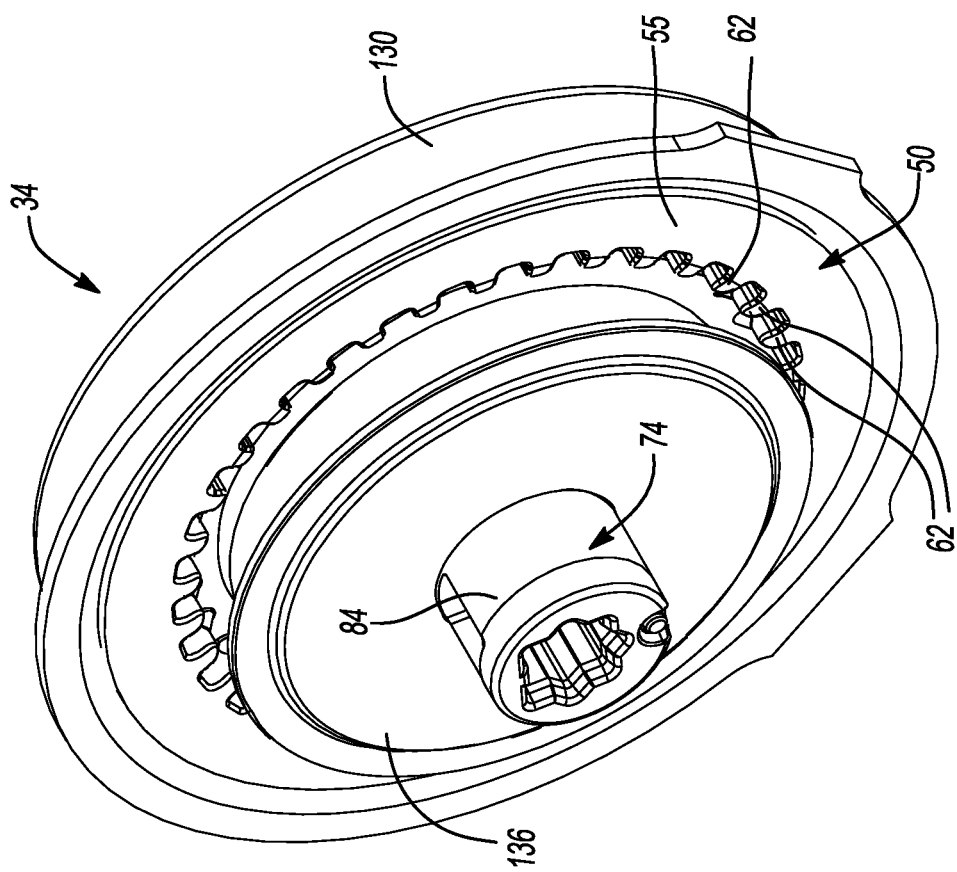
FIG. 3 is a perspective view of one recliner heart of the recliner assembly.

As shown in FIGS. 4-6, the second locking plate 52 may have a generally circular shape (FIGS. 5 and 6) and may include a plate body 64, a hub 65 and a rim 66. The plate body 64 may include projections 68 and teeth 69. The projections 68 may extend from a surface of the plate body 64 and may be received in respective openings 70 of the second bracket 32, thereby rotationally fixing the second locking plate 52 and the seatback 14. The teeth 69 may extend 360 degrees around an outer diametrical surface of the plate body 64. The hub 65 may extend from a center portion of the plate body 64 in a direction opposite of the projections 68 and may define an opening 72 extending therethrough. The rim 66 may extend 360 degrees around a periphery of the plate body 64 and may include teeth 74 (FIGS. 6 and 9) that extend 360 degrees around an inner diametrical surface of the rim 66.

As shown in FIGS. 5 and 6, the locking assembly 54 may include a hub 76, a bushing ring 77, a cam 78, a pair of wedges 80a, 80b and first and second springs or biasing members 82, 83.

Figure 7:
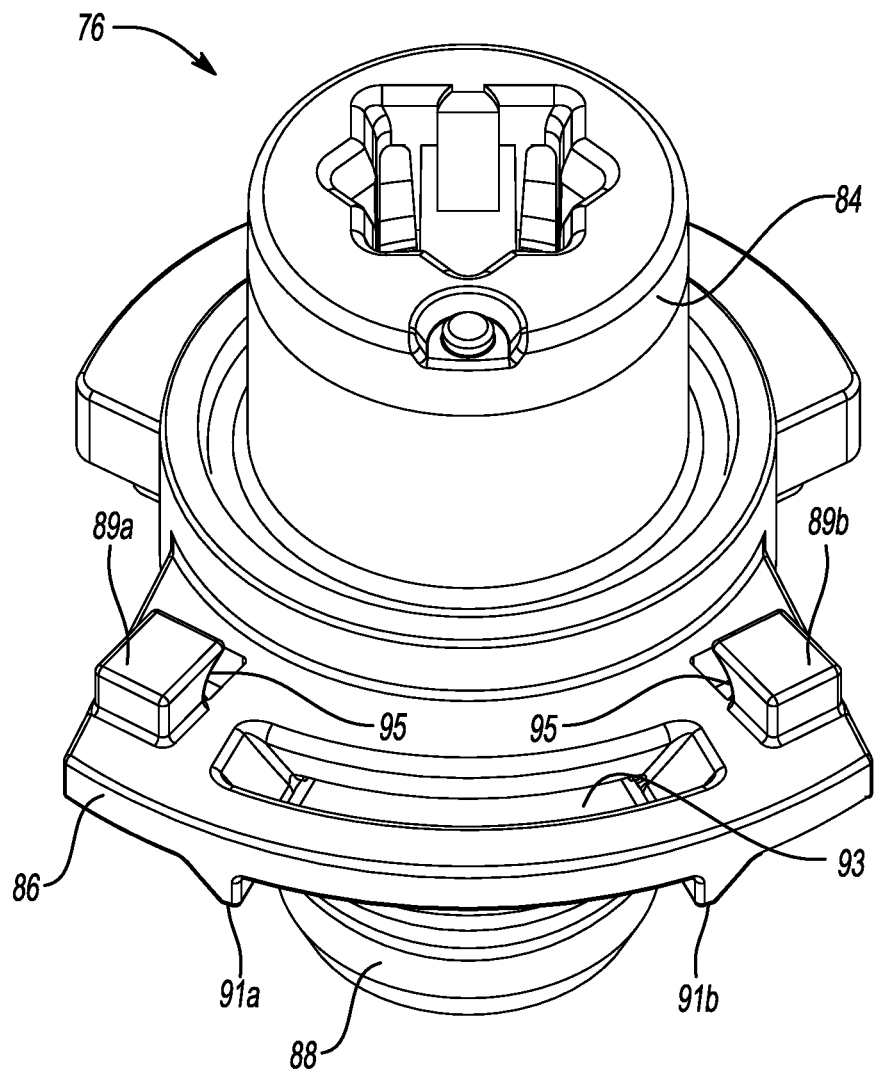
FIG. 7 is a perspective view of a hub of the recliner heart.

As shown in FIG. 7, the hub 76 may include a hub portion 84, a flange portion 86 and a shaft portion 88. The flange portion 86 may extend radially outward relative to the hub portion 84 and shaft portion 88. The flange portion 86 may include a pair of first projections 89a, 89b that extend axially from a first side of the flange portion 86 and a pair of second projections 91a, 91b that extend axially from a second side of the flange portion 86. The flange portion 86 may also include a curved slot 93 that extends through the first and second sides of the flange portion 86. Each first projection 89a, 89b may define a groove 95. The shaft portion 88 may extend axially from one side of the flange portion 86 and the hub portion 84 may extend axially from the other side of the flange portion 86. The shaft portion 88 may extend through the cam 78, the bushing ring 77, the opening 56 of the first locking plate 50 and the opening 72 of the hub 65 of the second locking plate 52. The shaft portion 88 may include a plurality of radially extending protrusions 90. The cross member 28 may be received in an aperture 87 of the hub 76 such that the hub 76 is drivingly engaged with the cross member 28. In this way, rotation of the cross member 28 causes corresponding rotation of the hub 76.

Figure 9:
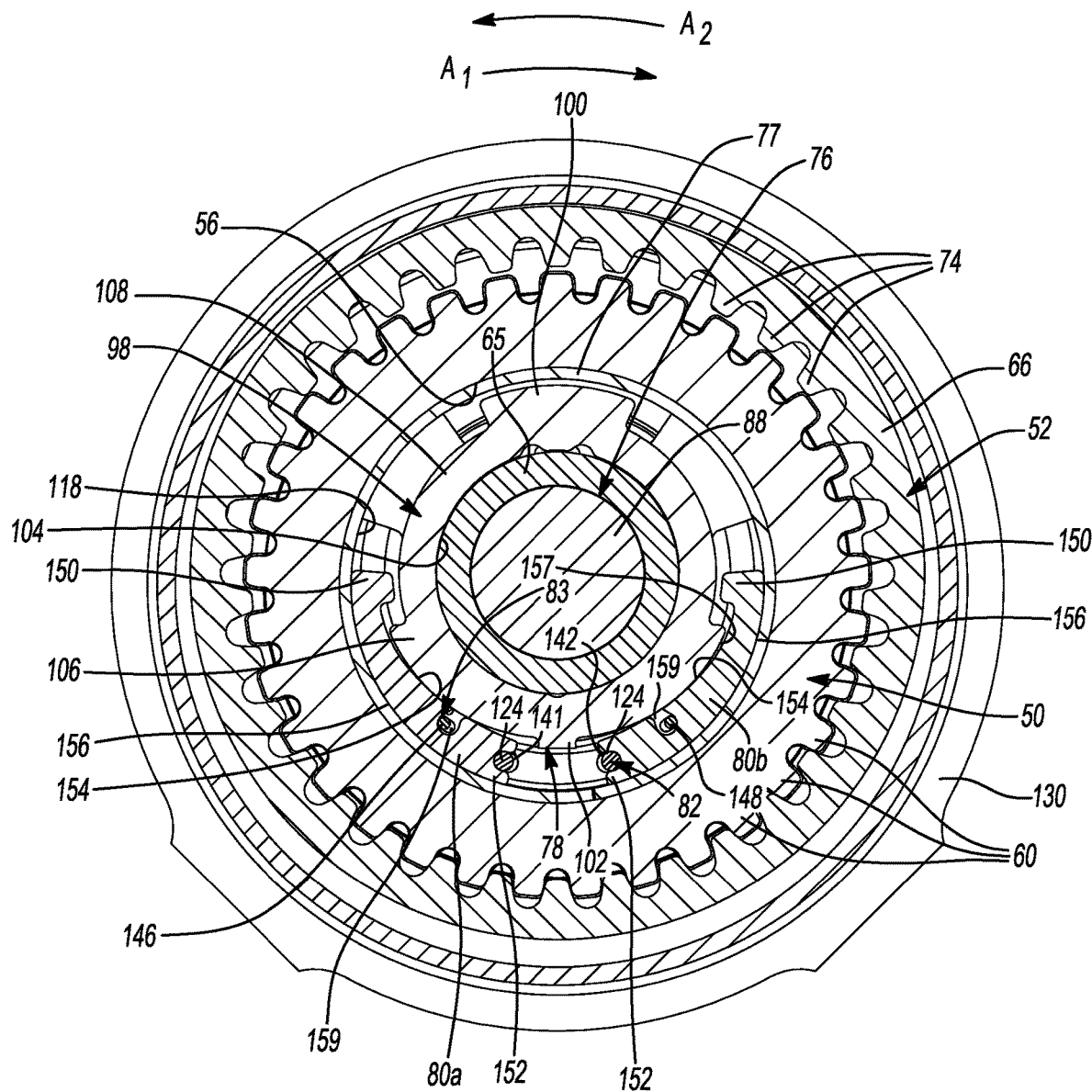
FIG. 9 is another cross-sectional view of the recliner heart in the first position.
Figure 11:
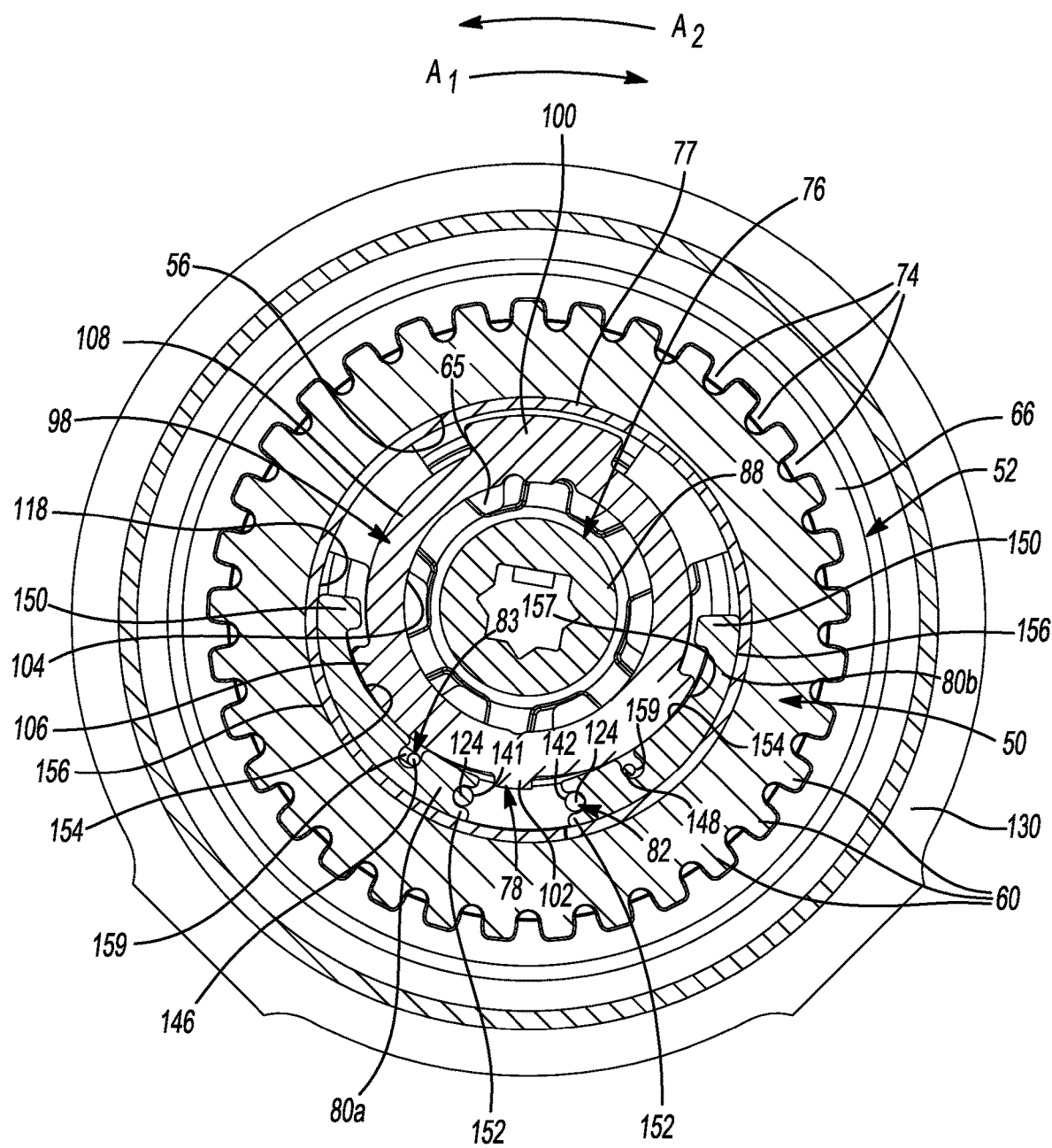
FIG. 11 is a cross-sectional view of the recliner heart in a second position.

A transfer plate 92 may be disposed between the flange portion 86 and the cam 78, and may include a plurality of first rectangular-shaped slots 94 and a plurality of second rectangular-shaped slots 96. Each protrusion 90 may be received in a respective first slot 94, thereby rotationally fixing the transfer plate 92 to the hub 76. As shown in FIGS. 9 and 11, the bushing ring 77 may be pressed-fitted into the opening 56 of the first locking plate 50 and between the inner section 53 of the first locking plate 50 and the cam 78.

As shown in FIGS. 5-9 and 11, the cam 78 may be disposed around the hub 65 of the second locking plate 52 (FIGS. 8, 9 and 11) and may include a body 98, an attachment portion 100 and a distal portion 102. The body 98 may be circular in shape and may define an aperture 104 that receives the hub 65 of the second locking plate 52. The body 98 may have a first portion 106 and a second portion 108. The first portion 106 may have a thickness that is greater than a thickness of the second portion 108 of the body 98.

The attachment portion 100 may be rectangular-shaped and may be integral with an outer surface of the second portion 108 of the body 98 (FIGS. 5, 6, 9 and 11). The attachment portion 100 may include an end that extends through one of the second slots 96 of the transfer plate 92 such that the cam 78 and the hub 76 are rotationally fixed to each other. The distal portion 102 may be integral with an outer surface of the first portion 106 such that it is 180 degrees opposite the attachment portion 100.

As shown in FIGS. 9 and 11, the wedges 80a, 80b are disposed between the body 98 and the bushing ring 77. Each wedge 80*a*, 80*b* has a first end 150 and a second end 152. The first end 150 extends into a respective second slot 96 of the transfer plate 92. Each wedge 80*a*, 80*b* increases in thickness from the first end 150 toward the second end 152. Each wedge 80*a*, 80*b* also has a groove 124 at or near the second end 152 that receives the first spring 82 such that the first spring 82 forces the wedges 80*a*, 80*b* outwardly and away from the distal portion 102. Each wedge 80*a*, 80*b* also has a curved inner surface 154 and a curved outer surface 156. The inner surface 154 may contact a surface 157 of the first portion 106 of the body 98 and may include a groove 159 formed therein. The groove 159 receives the second spring 83 such that the second spring 83 further forces the wedges 80*a*, 80*b* outwardly and away from the distal portion 102. The outer surface 156 may contact the inside surface 118 of the bushing ring 77.

Figure 10:
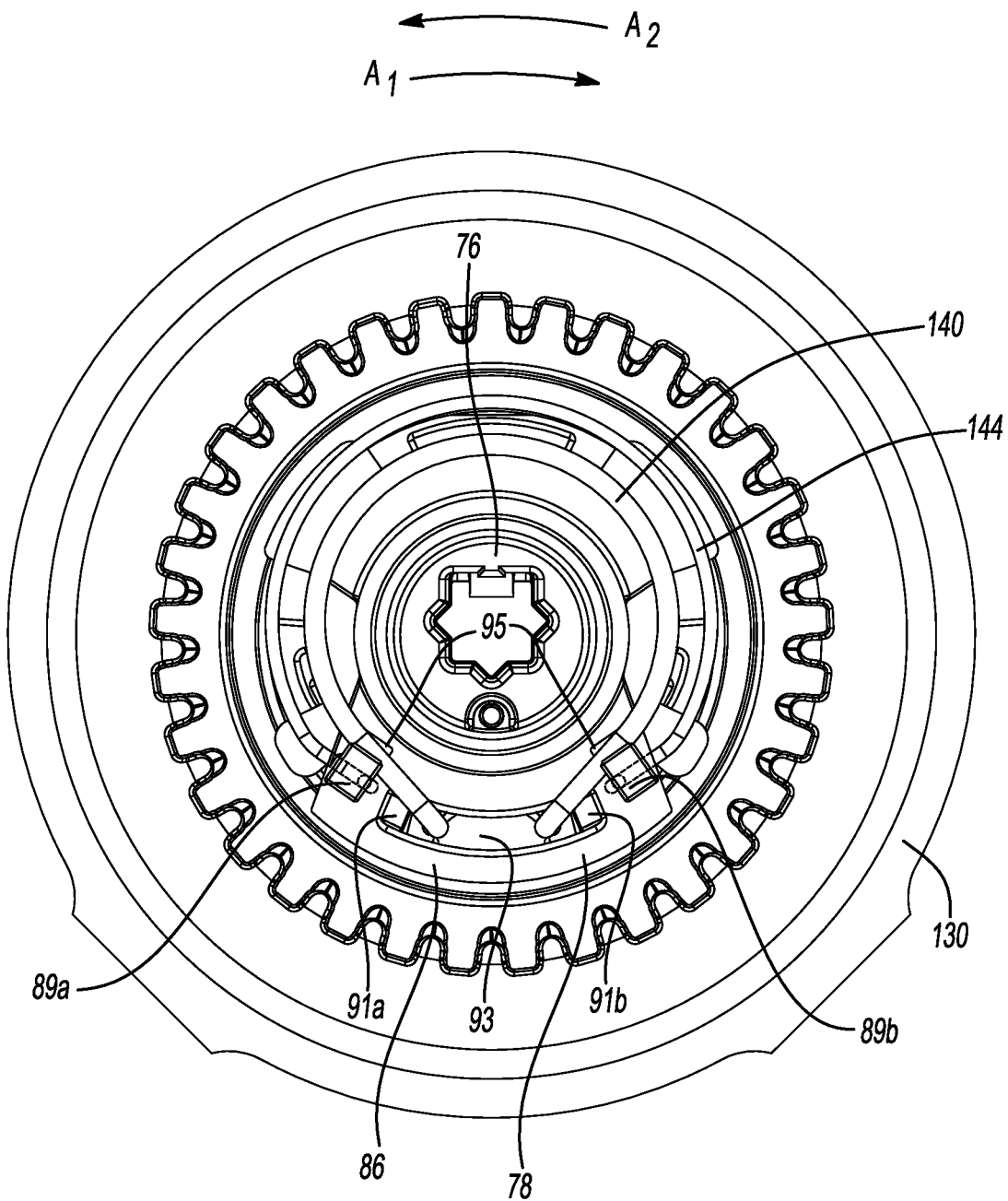
FIG. 10 is a plan view of a portion of the recliner heart in the first position.
Figure 12:
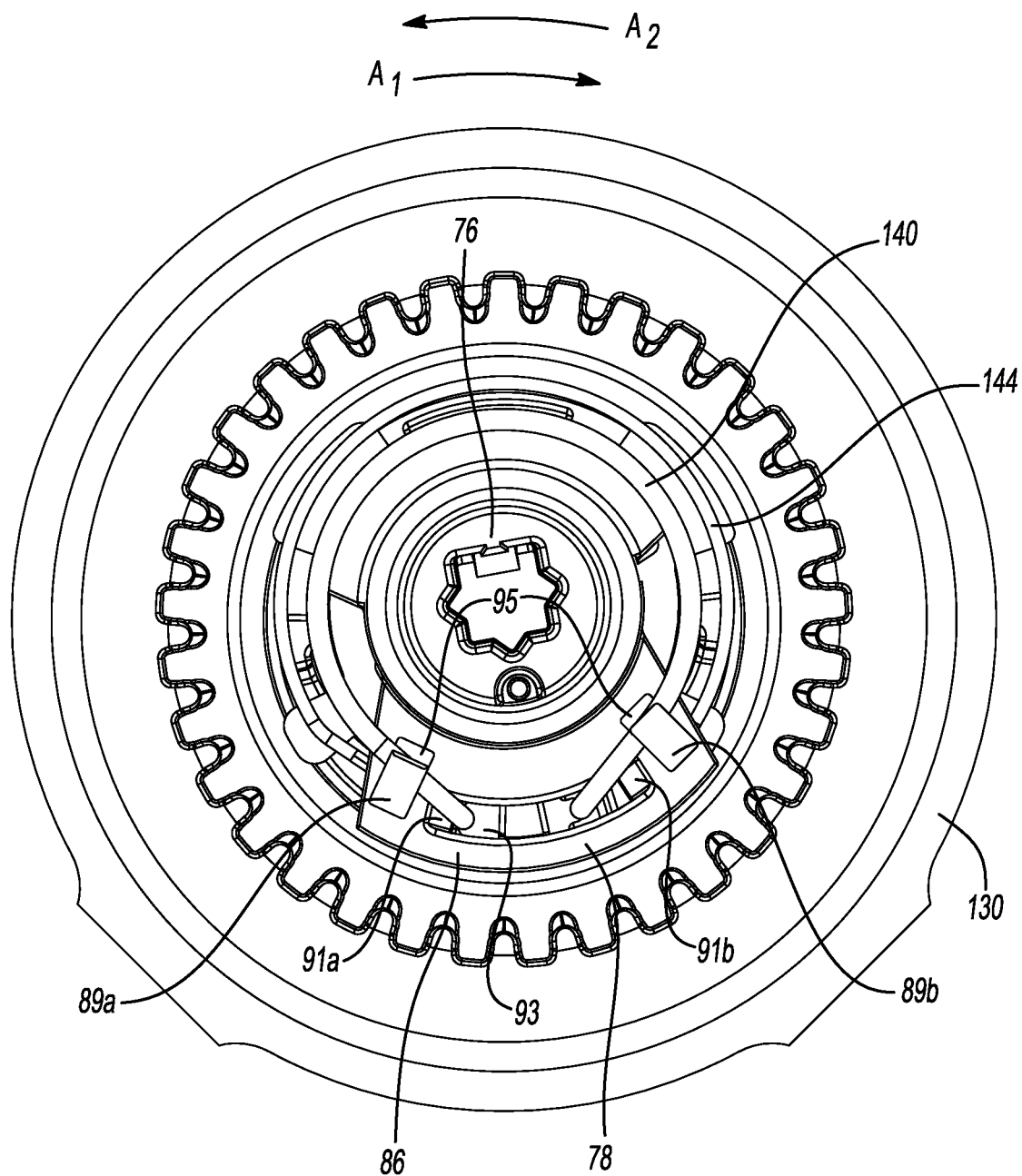
FIG. 12 is a plan view of a portion of the recliner heart in the second position.

The first spring 82 includes a curved (or arc shaped) body 140, a first leg 141, and a second leg 142. The body 140 extends at least partially around a circumferential surface of the hub 76 and is at least partially received in the grooves 95 of the projections 89*a*, 89*b* of the hub 76 so that the hub 76 slides along the body 140 when rotated (FIGS. 10 and 12). The first leg 141 extends from a first end of the body 140 and the second leg 142 extends from a second end of the body 140. The first and second legs 141, 142 extend through the curved slot 93 of the hub 76 and are received in the grooves 124 of the wedges 80*a*, 80*b*, respectively (FIGS. 9 and 11).

The second spring 83 includes a curved (or arc shaped) body 144, a first leg 146, and a second leg 148. The body 144 extends at least partially around a circumferential surface of the hub 76. The first leg 146 extends from a first end of the body 144 and is received in the groove 159 of the wedge 80*a*, and the second leg 148 extends from an opposing second end of the body 144 and is received in the groove 159 of the wedge 80*b*. The first spring 82 has a first spring force that is greater than a second spring force of the second spring 83. The second spring force is applied to the wedges 80*a*, 80*b* independently of the first spring force. The second spring 83 surrounds the first spring 82.

Figure 8:
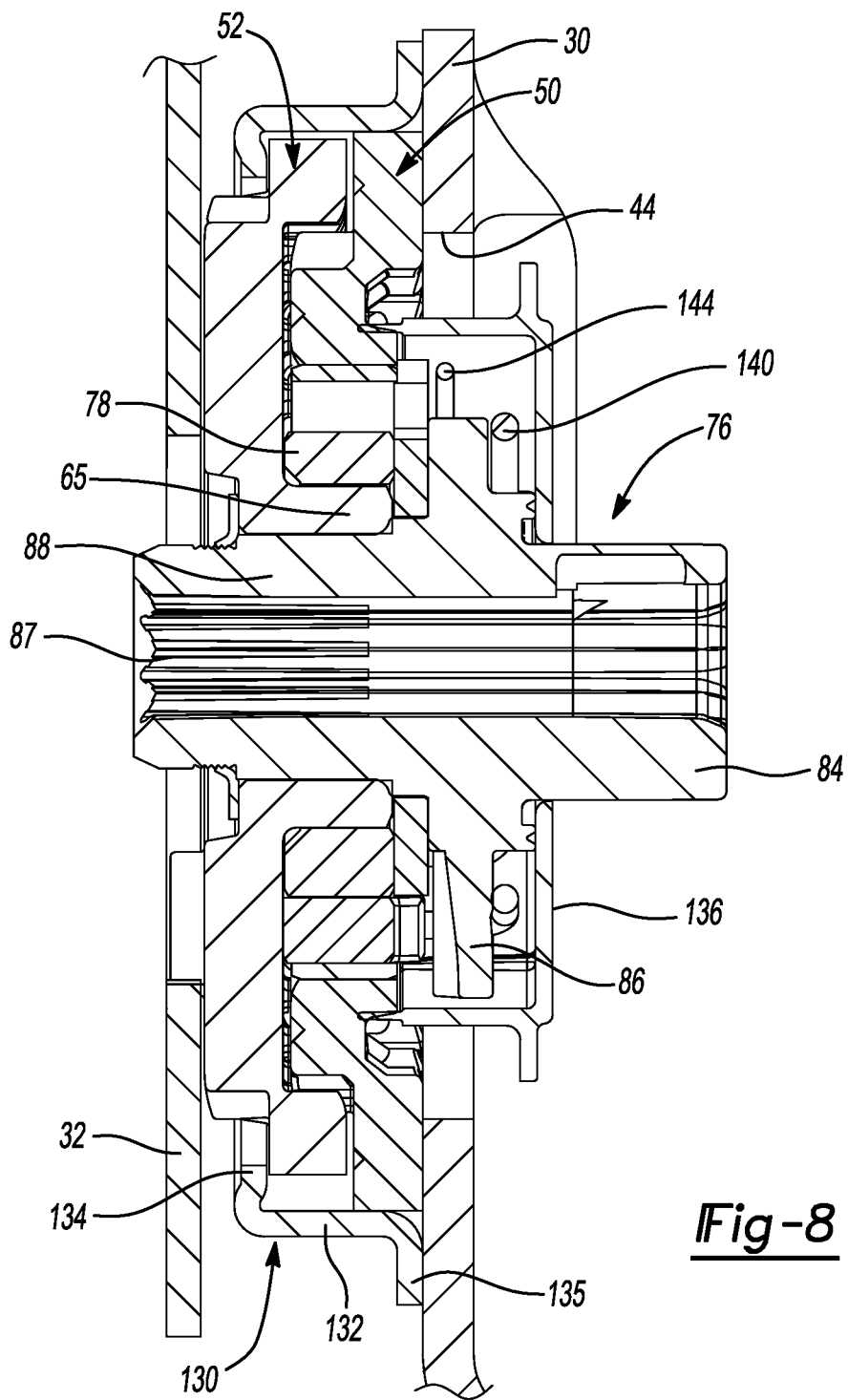
FIG. 8 is a cross-sectional view of the recliner heart in a first position.

An encapsulating ring 130 may include a body 132, a lip 134 that extends radially inwardly from a first axial end of the body 132, and a flange 135 that extends radially outwardly from a second axial end of the body 132. As shown in FIG. 8, the body 132 may be attached (e.g., by laser welding) to the first locking plate 50 to hold the recliner heart 34 together and also to cover a periphery of the recliner heart 34, thereby preventing debris and fluid from infiltrating and damaging the recliner heart 34. A circular-shaped cap 136 may be attached (e.g., laser welding) to the flange portion 86 and may cover the recliner heart 34, thereby preventing debris and fluid from infiltrating and damaging the recliner heart 34.

The structure and function of the second recliner mechanism 26 may be similar or identical to that of the first recliner mechanism 24, and therefore, will not be described again in detail.

With reference to FIGS. 1-12, operation of the recliner assembly 10 will be described in detail. Prior to actuating an actuation switch 143 (shown schematically in FIG. 1) that controls the motor 29 of the seat assembly 12, the first and second springs 82, 83 force the wedges 80*a*, 80*b* outwardly such that the wedges 80*a*, 80*b* are wedged between the first portion 106 of the body 98 and the bushing ring 77. In this way, the first and second recliner mechanisms 24, 26 are in the locked state thereby preventing relative rotation between the seatback 14 and the seat bottom 16.

When a user actuates the actuation switch 143, the motor 29 drives the cross member 28, which causes the hub 76 to rotate. Rotation of the hub 76 in the clockwise direction A1 causes the projection 91*b* of the hub 76 to contact and move the first leg 141 of the first spring 82, thereby reducing the first spring force on the wedge 80*a* that the first leg 141 is contacting (rotation of the hub 76 in the counter-clockwise direction A2 causes the projection 91*a* of the hub 76 to contact and move the second leg 142 of the first spring 82, thereby reducing the first spring force on the wedge 80*b* that the second leg 142 is contacting). Once the force on the wedge 80*a* is reduced (or the force on the wedge 80*b* when the hub 76 is rotated in the counter-clockwise direction A2), the hub 76, the transfer plate 92, the cam 78 and the wedges 80*a*, 80*b* rotate relative to the first locking plate 50 and the bushing ring 77. Rotation of the hub 76, the transfer plate 92, the cam 78 and the wedges 80*a*, 80*b* causes rotation of the second locking plate 52 relative to the first locking plate 50 and the bushing ring 77. In this way, a portion of the teeth 74 of the second locking plate 52 are meshingly engaged with a portion of the teeth 60 of the first locking plate 50 at different points in the rotational path as the second locking plate 52 rotates about the first locking plate 50, thereby rotating the seatback 14.

As shown in FIGS. 9 and 11, as the wedges 80*a*, 80*b* rotate, the second spring 83 continues to apply the second spring force to the wedges 80*a*, 80*b* such that the wedges 80*a*, 80*b* remain in contact with the cam 78 and the bushing ring 77.

One of the benefits of the recliner mechanisms 24, 26 of the present disclosure is that the first and second springs 82, 83 provide sufficient force to the wedges 80*a*, 80*b* to reduce free play between the seatback 14 and seat bottom 16 when the recliner mechanisms 24, 25 are in the locked position without resulting in failure of the internal components of the recliner heart 34 (e.g., without resulting in failure of the surface 118 of the bushing ring 77). Another benefit of the recliner mechanisms 24, 26 of the present disclosure is that the second spring 83 having a second spring force that is less than the first spring force continues to provide the second spring force to the wedges 80*a*, 80*b* as the wedges 80*a*, 80*b* rotate which reduces wear on the surface 118 of the bushing ring 77 while causing a smoother rotation of the seatback 14. This, in turn, reduces the torque required to rotate the seatback 14.

Figure 13:
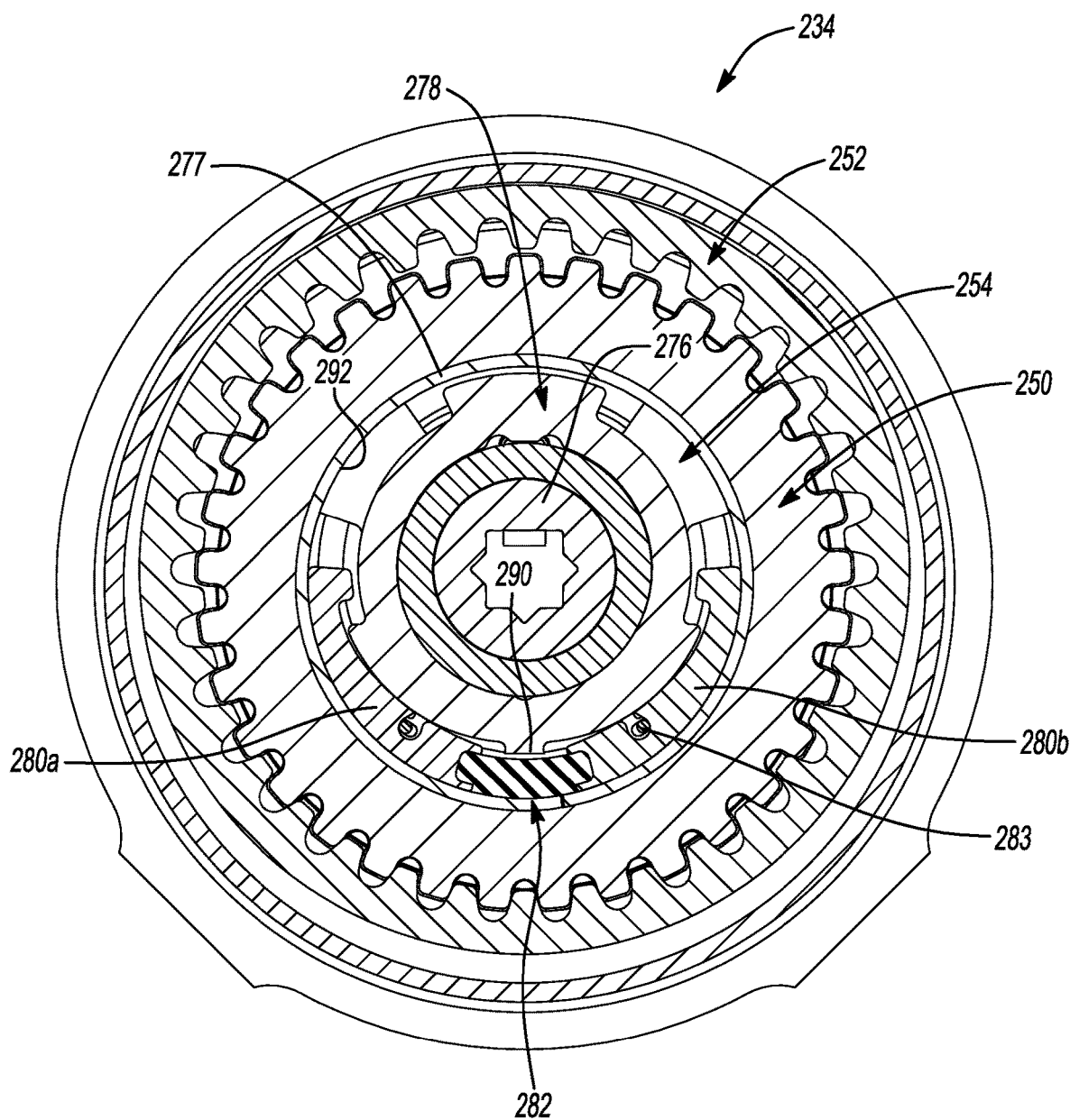
FIG. 13 is a cross-sectional view of another recliner heart.

With reference to FIG. 13, another recliner heart 234 is provided. The recliner heart 234 may be incorporated into the recliner mechanism 24, 26 described above instead of the recliner heart 34. The structure and function of the recliner heart 234 may be similar or identical to the recliner heart 34 described above, apart from any exception noted below.

The recliner heart 234 may include a first locking plate 250, a second locking plate 252 and a locking assembly 254. The structure and function of the first locking plate 250 and the second locking plate 252 may be similar or identical to the first locking plate 50 and the second locking plate 52, respectively, described above, and therefore, will not be described again in detail.

The locking assembly 254 may include a hub 276, a bushing ring 277, a cam 278, a pair of wedges 280*a*, 280*b* and first and second biasing members 282, 283. The structure and function of the hub 276, the bushing ring 277, the cam 278, the pair of wedges 280*a*, 280*b* and second biasing member 283 may be similar or identical to the hub 76, the bushing ring 77, the cam 78, the pair of wedges 80*a*, 280*b* and the second biasing member 83, respectively, described above, and therefore, will not be described again in detail.

The first biasing member 282 may be located between the wedges 280a, 280b and may force the wedges 280a, 280b outwardly and away from a distal portion 290 of the cam 278. The first biasing member 282 may have a first biasing force that is greater than a second biasing force of the second biasing member 283. The first biasing member 282 may be made of a resiliently compressible material (e.g., rubber) or a porous polymeric material. In some configurations, the first biasing member 282 may be made of a fibrous material (e.g., felt material), for example, or any other absorbent material. The first biasing member 282 may be saturated with lubricant (e.g., oil) and may contact an inside surface 292 of the bushing ring 277. In this way, when the hub 276, the cam 278 and the wedges 280a, 280b rotate relative to the first locking plate 250 and the bushing ring 277, the first biasing member 282 may also rotate and lubricate the inside surface 292 of the bushing ring 277.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A recliner heart comprising:
   a first locking plate including an outer diametrical surface having first teeth formed thereon;
   a second locking plate rotatable relative to the first locking plate and including a first inner diametrical surface having second teeth formed thereon, some of the second teeth are meshingly engaged with some of the first teeth;
   a hub extending through the first and second locking plates and configured to rotate;
   a pair of wedges;
   a first biasing member configured to apply a first biasing force to the pair of wedges; and
   a second biasing member configured to apply a second biasing force to the pair of wedges,
   wherein the hub is rotatable between a first position in which the first and second biasing forces are applied to the pair of wedges to restrict rotation of the second locking plate relative to the first locking plate, and a second position in which the first biasing force applied to one wedge of the pair of wedges is reduced to allow rotation of the second locking plate relative to the first locking plate, and
   wherein each wedge includes a first end, an opposing second end, an arcuate inner surface, and an arcuate outer surface, and wherein a first groove is formed at the second end and a second groove is formed at the arcuate inner surface.

2. The recliner heart of claim 1, wherein the second biasing member applies the second biasing force to the pair of wedges when the first hub is in the second position.

3. The recliner heart of claim 1, wherein the first and second biasing forces are applied independently of each other.

4. The recliner heart of claim 1, wherein the first biasing force is greater than the second biasing force.

5. The recliner heart of claim 1, wherein the first biasing member is a first spring and the first biasing force is a first spring force, and the second biasing member is a second spring and the second biasing force is a second spring force, the first spring force is greater than the second spring force.

6. The recliner heart of claim 5, wherein the second biasing member surrounds the first biasing member.

7. The recliner heart of claim 1, wherein the second biasing member is disposed between the pair of wedges and is made of a resiliently compressible material.

8. The recliner heart of claim 7, wherein the second biasing member is saturated with lubricant, wherein the recliner heart further comprises a bushing ring disposed between the pair of wedges and the first locking plate, and wherein the second biasing member is configured to rotate relative to the bushing ring to lubricate the bushing ring.

9. A recliner heart comprising:
   a first locking plate including an outer diametrical surface having first teeth formed thereon;
   a second locking plate rotatable relative to the first locking plate and including a first inner diametrical surface having second teeth formed thereon, some of the second teeth are meshingly engaged with some of the first teeth;
   a hub extending through the first and second locking plates and configured to rotate, the hub including a pair of projections spaced apart from each other;
   a pair of wedges;
   a first spring configured to apply a first spring force to the pair of wedges; and
   a second spring configured to apply a second spring force to the pair of wedges,
   wherein the hub is rotatable between a first position in which the first and second spring forces are applied to the pair of wedges to restrict rotation of the second locking plate relative to the first locking plate, and a second position in which one of the projections contacts the first spring to reduce the first spring force applied to one wedge of the pair of wedges thereby allowing rotation of the second locking plate relative to the first locking plate,
   wherein each wedge includes a first end, an opposing second end, an arcuate inner surface, and an arcuate outer surface, and wherein a first groove is formed at the second end and a second groove is formed at the arcuate inner surface.

10. The recliner heart of claim 9, wherein the first spring includes first and second legs and the second spring includes third and fourth legs, and wherein the first and second legs are disposed in respective first grooves and the third and fourth legs are disposed in respective second grooves.

11. The recliner heart of claim 10, wherein each wedge increases in thickness from the first end toward the second end.

12. The recliner heart of claim 10, wherein the second spring surrounds the first spring.

13. The recliner heart of claim 10, wherein the first spring force is greater than the second spring force.

14. The recliner heart of claim 10, wherein the first and second spring forces are applied independently of each other.

15. A recliner heart comprising:
   a first locking plate including an outer diametrical surface having first teeth formed thereon;
   a second locking plate rotatable relative to the first locking plate and including a first inner diametrical surface having second teeth formed thereon, some of the second teeth are meshingly engaged with some of the first teeth;

a hub extending through the first and second locking plates and configured to rotate, the hub including a pair of projections spaced apart from each other;

a pair of wedges;

a first spring configured to apply a first spring force to the pair of wedges; and a second spring configured to apply a second spring force to the pair of wedges, wherein the hub rotatable between a first position in which the first and second spring forces are applied to the pair of wedges to restrict rotation of the second locking plate relative to the first locking plate, and a second position in which one of the projections contacts the first spring to reduce the first spring force applied to one wedge of the pair of wedges thereby allowing rotation of the second locking plate relative to the first locking plate, wherein the projections define a curved slot therebetween, and wherein the first spring is at least partially received in the curved slot.

16. The recliner heart of claim 15, wherein:

the first spring includes a first leg and a second leg, the first and second legs extend through the curved slot, when the hub is in the first position, both of the projections are spaced apart from both of the first and second legs, and when the hub is in the second position, the one of the projections contacts one of the first and second legs of the first spring to reduce the first spring force applied to the one wedge of the pair of wedges.

17. The recliner heart of claim 16, wherein the hub includes a flange portion, a hub portion extending axially from a first side of the flange portion and a shaft portion extending axially from a second side of the flange portion and through the first and second locking plates, and wherein the projections extend from the flange portion.

18. The recliner heart of claim 9, wherein the first spring includes a first leg and a second leg, and wherein when the hub is in the second position, the one of the projections contacts one of the first and second legs of the first spring to reduce the first spring force applied to the one wedge of the pair of wedges.

19. The recliner heart of claim 15, wherein each wedge includes a first end, an opposing second end, an arcuate inner surface, and an arcuate outer surface, and wherein a first groove is formed at the second end and a second groove is formed at the arcuate inner surface.

20. The recliner heart of claim 19, wherein the first spring includes first and second legs and the second spring includes third and fourth legs, and wherein the first and second legs are disposed in respective first grooves and the third and fourth legs are disposed in respective second grooves.

* * * * *

UNITED STATES PATENT AND TRADEMARK OFFICE
CERTIFICATE OF CORRECTION

| | | |
|---|---|---|
| PATENT NO. | : 11,897,372 B2 | Page 1 of 1 |
| APPLICATION NO. | : 17/720609 | |
| DATED | : February 13, 2024 | |
| INVENTOR(S) | : Ralph L. Schmitz et al. | |

It is certified that error appears in the above-identified patent and that said Letters Patent is hereby corrected as shown below:

On the Title Page

Other Publications:

Page 4, Column 2, Line number 48: before "Office", insert --German--

In the Claims

Column 11, Line 9: Claim 15, after "hub", insert --is--

Signed and Sealed this
Second Day of April, 2024

Katherine Kelly Vidal
*Director of the United States Patent and Trademark Office*